United States Patent
Baughman

(10) Patent No.: US 8,015,128 B2
(45) Date of Patent: Sep. 6, 2011

(54) BIOMETRIC SECURITY USING NEUROPLASTIC FIDELITY

(75) Inventor: Aaron K. Baughman, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 11/865,173

(22) Filed: Oct. 1, 2007

(65) Prior Publication Data

US 2009/0307164 A1      Dec. 10, 2009

Related U.S. Application Data

(60) Provisional application No. 60/827,717, filed on Oct. 1, 2006.

(51) Int. Cl.
*G06F 15/18* (2006.01)
*G06N 3/00* (2006.01)
(52) U.S. Cl. .................. 706/13; 706/15; 706/18; 706/20
(58) Field of Classification Search .................. None
See application file for complete search history.

(56) References Cited

U.S. PATENT DOCUMENTS 6,070,159 A    5/2000 Wilson et al.
7,146,217 B2  12/2006 Firlik et al.

FOREIGN PATENT DOCUMENTS

WO    2006053375 A1    5/2006

OTHER PUBLICATIONS

Lin et al., S., "Face Recognition/Detection by Probabilistic Decision-Based Neural Network", IEEE Transactions on Neural Networks, vol. 8, No. 1, pp. 114-132, Jan. 1997.*
Schaffer et al., J., "Combinations of Genetic Algorithms and Neural Networks: A Survey of the State of the Art", IEEE, pp. 1-37, 1992.*
Logar et al., A., "A Don't Care Back Propagation Algorithm Applied to Satellite Image Recognition", ACM, pp. 369-373, 1994.*
Holmstrom et al., L., "Using Additive Noise in Back-Propagation Training", IEEE Transactions on Neural Networks, vol. 3, No. 1, pp. 24-38, Jan. 1992.*
Rowley et al., H., "Neural Network-Based Face Detection", IEEE Transactions on Pattern Analysis and Machine Intelligence, vol. 20, No. 1, pp. 23-38, Jan. 1998.*
Kittler et al., J., "Fusion of Multiple Experts in Multimodal Biometric Personal Identity Verification Systems", IEEE, pp. 3-12, 2002.*
Ellison, C. & Dohrmann, S. "Public-Key Support for Group Collaboration". ACM Transactions on Information and System Security, vol. 6, No. 4, Nov. 2003, pp. 547-565.
Jain, A. K. et al. "Data Clustering: A Review". ACM Computing Surveys, vol. 31, No. 3, Sep. 1999.

* cited by examiner

*Primary Examiner* — Jeffrey A Gaffin
*Assistant Examiner* — Adrian L Kennedy
(74) *Attorney, Agent, or Firm* — Douglas A. Lashmit; Hoffman Warnick LLC

(57) ABSTRACT

A system, method and program product for providing biometric security using neuroplastic fidelity. A method is disclosed that includes: receiving biometric data; analyzing the biometric data with a probabilistic neural network and outputting a chromosome containing a binary string; mapping the binary string to a selected extractor and a selected matcher; apply the selected extractor to the biometric data to generate a template; using the selected matcher to compare the template to a set of stored templates to identify a match; and outputting a result.

13 Claims, 4 Drawing Sheets

BIOMETRIC SECURITY USING NEUROPLASTIC FIDELITY

PRIORITY CLAIM

The present invention claims priority to provisional application Ser. No. 60/827,717 entitled Amorphous Data Scoping, filed on Oct. 1, 2006, the contents of which is hereby incorporated by reference.

FIELD OF THE INVENTION

This disclosure relates generally to biometric security and more particularly to a biometric security system and method that emulates brain plasticity for dynamic biometric matching capability.

BACKGROUND OF THE INVENTION

Biometric security, e.g., involving finger prints, facial recognition, etc., has become a rapidly expanding method for identifying individuals for verification and identification purposes. In a typical system, a sensor is used to collect biometric data, e.g., via an image acquisition system. After the data is preprocessed (e.g., to remove artifacts), it is passed to a feature extractor. The features are generally captured as a set of feature vectors. The feature vectors are used to create a template. A template is a synthesis of all the characteristics extracted from the source generally in the form of x, y, alpha, and theta, which is used by a biometric matcher.

If training is being performed, the template is simply stored somewhere (e.g., on a card or within a database or both). In a matching phase, the obtained template is passed to a matcher that compares the inputted template with other existing templates, estimating the distance between them using any algorithm (e.g., Hamming distance). A result can then be output for a specified use or purpose (e.g., entrance in a restricted area).

Biometric systems have several areas of vulnerabilities that could jeopardize user privacy and alter the receiver operating characteristic (ROC) curve. One such ROC curve is a plot of True Accept rates versus False Accept rates that provide measurements to compare various biometric systems. At the sensor level, a user could present a fake biometric and attempt to spoof a legitimate biometric. After the signal acquisition (e.g., fingerprint), the image or wavelet scalar quantization file is sent to the feature extraction module. A user could circumvent the signal acquisition stage and submit a previously enrolled image or digitally modified image to the feature extraction module. On the feature extraction module, a Trojan horse piece of malicious code might produce feature vectors that optimize the chances of a false accept.

Additionally, a feature vector set could be tampered with to produce false feature sets. The feature vector vulnerability is critical for clustering algorithms. Furthermore, if the feature extraction and matcher modules are separated, the socket connection (TCP/IP) providing a network interface is vulnerable for template interception. Further, each matcher on the system could be attacked resulting in the production of preselected scores. Also, templates or feature vectors that represent biometric feature extraction may be stored within remote or local centralized or distributed databases. The servers that house the databases are vulnerable to attack such that an intruder could steal or modify the templates. The results could increase the false accept and the false negative rates. Moreover, as stored templates are sent to the matcher, the features could be intercepted and modified. After the matching process is complete, the deterministic or probabilistic answer could be overridden by a hacker. Accordingly, biometric systems are subject to numerous vulnerabilities.

SUMMARY OF THE INVENTION

The present invention utilizes the concept of neuroplastic fidelity to enable the secure generation of data templates through unsupervised and supervised machine learning. The technology is modeled from the natural plasticity of the brain, whose robustness lends to a model for digital agility. As such, a system and method are provided that can handle entropy and service a digital physiological system, thus providing a high fidelity data system. Namely, a solution is disclosed that maps characterized data to an optimal pair of feature extractors and matchers.

In one embodiment, there is a biometric security system, comprising: a plurality of extractors, each configured for generating a template based on inputted biometric data; a plurality of matchers, each configured for comparing a template to a plurality of previously enrolled templates to determine whether a match exists; and a selection system that analyzes submitted biometric data and selects an extractor/matcher pair to process the submitted biometric data.

In a second embodiment, there is a method for providing biometric security, comprising: receiving biometric data; analyzing the biometric data with a probabilistic neural network and outputting a chromosome; mapping the chromosome to a selected extractor and a selected matcher; applying the selected extractor to the biometric data to generate a template; using the selected matcher to compare the template to a set of stored templates to identify a match; and outputting a result.

In a third embodiment, there is a computer program product stored on a computer readable medium, which when executed by a computer system provides biometric security, and comprises: program code for receiving biometric data; program code for analyzing the biometric data with a probabilistic neural network and outputting a chromosome; program code for mapping the chromosome to a selected extractor and a selected matcher; program code for applying the selected extractor to the biometric data to generate a template; program code for using the selected matcher to compare the template to a set of stored templates to identify a match; and program code for outputting a result.

In a fourth embodiment, there is a method for deploying a system for providing biometric security, comprising: providing a computer infrastructure being operable to: receive biometric data; analyze the biometric data with a probabilistic neural network and output a chromosome containing a binary string; map the binary string to a selected extractor and a selected matcher; apply the selected extractor to the biometric data to generate a template; use the selected matcher to compare the template to a set of stored templates to identify a match; and output a result.

The human brain is extremely robust and resilient through the capability of structural change with learning, trauma, development, system injury and stimulation. With the continual change of brain structure, maintaining a detailed neuron map is difficult to sustain. The change in structure protects the overall physiological system's functionality. Each change enables the system to handle a world of entropy. These common principles are extended herein to a concept referred to herein as neuroplastic fidelity.

Neuroplastic fidelity of data and data systems provide a layer of protection to prevent an immune resistant strain in the form of producible data that could be utilized to create a template. As such, with the solution described herein, vulnerability of a biometric system is greatly reduced.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
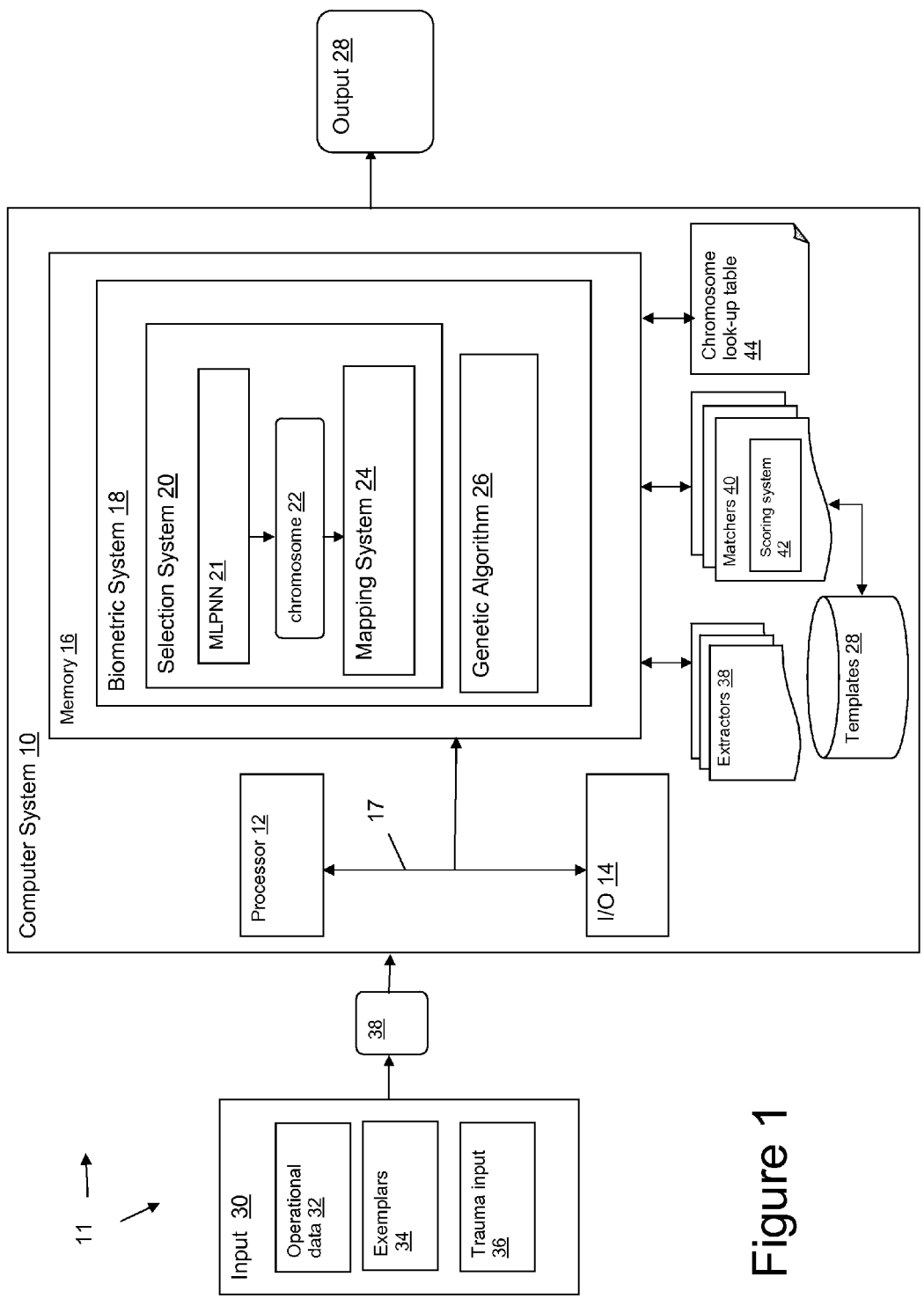
FIG. 1 depicts a computer system having a biometric system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

FIG. 1 depicts a neuroplastic fidelity system 11 that includes a computer system 10 having a biometric system 18 that provides enhanced security against vulnerabilities. Two modes of operation exist within the neuroplastic fidelity system 11. The first mode is a training phase, which from a machine learning perspective, produces a set of neural network weights for use by a probabilistic neural. The second mode comprises a matching phase in which live data is analyzed to produce biometric matching scores. Biometric system 18 provides a platform in which one of a plurality of possible different matcher/extractor pairs are utilized to process inputted biometric data to determine an output 28. Biometric system 18 includes a selection system 20 that characterizes vector data 38 received from an input 30 using, e.g., a probabilistic neural network, and generates a chromosome 22 (e.g., a binary string). The chromosome 22 is then fed to a mapping system 24 to determine an appropriate extractor/matcher pair from the set of available extractors 38 and matchers 40. Once determined, the selected extractor 38 generates a template that is then compared by the selected matcher 40 to a stored set of templates 28 to determine if there is a match.

Any now known or later developed types of extractors 38 and matchers 40 may be utilized. Illustrative feature extraction processes include, e.g., matrix templates, line tracers, image quality correlation, fisher linear discriminate, etc. In addition, it is also understood that while shown together, extractors 38 and matchers 40 may reside apart from each other on disparate systems.

Figure 4:
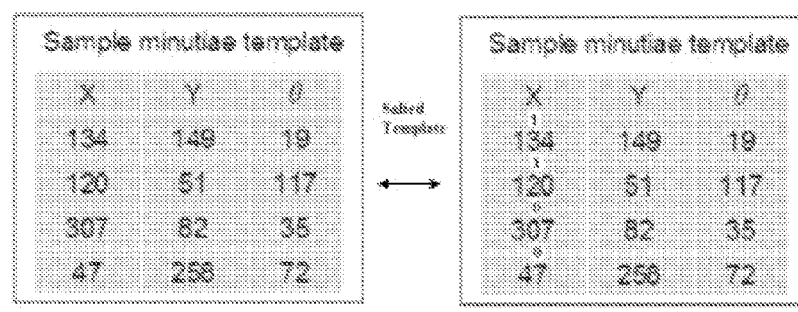
FIG. 4 depicts template being salted in accordance with an embodiment of the present invention.

A selected extractor/matcher pair may be linked in any manner. In one illustrative embodiment, a watermark may be placed into the template generated by the extractor to create a "salted template". The watermark may for example include a binary string that can be used to determine the matcher. An example of this is shown in FIG. 4, in which a salted template on the right includes the binary numbers 1100. Each matcher may also include a unique scoring system 42 that produces a different scaled score. As such, corrupting the matchers 40 becomes increasingly difficult as the number of matchers 40 grow since each matcher produces a different scaled score. A corrupted matcher must produce scores within range and in a normal distribution before score normalization occurs for all N matchers. If each matcher is isolated behind individual private keys within the PKI framework, corruption of all matchers must break each firewall.

Overriding a matcher's final decision becomes increasingly hard as the number of matchers grow. Each matcher has a different score range such as NIST's Bozorth3 and Identix algorithms. A relationship between score and matcher is established to normalize score ranges into a final decision. As such, an intruder will have to determine the relationship of score to matcher before the score can be altered. Otherwise, the altered score might be out of range or not enough to change the final decision.

A feature of the present invention is the process in which selection system 20 generates the chromosome 22, based on the input 30. In the illustrative embodiment, a Multi-Layer Probabilistic Neural Network (MLPNN) 21 is provided to process the input and generate a bit string (i.e., chromosome). Three generic types of inputs are utilized. The first type is the input of data within a particular domain called operational data 32. Operational data 32 is data that is collected and analyzed during normal operations to identify individuals. For example, a face recognition system accepts a face image as operational data when a face is present for identification or verification purposes. A second type of data is called exemplars 34. Exemplars 34 are utilized to train the MLPNN 21 through supervision. A training queue holds input data with the appropriate result. The MLPNN 21 is trained until the correct series of output patterns result for the training data. The third type of input comprises trauma input 36, which essentially includes random extreme noise that is generated and inserted into the training queue. Trauma input 36 and the desired results are created to affect the plasticity of the MLPNN. Note that trauma input 36 can be introduced to the system at any time. In an illustrative embodiment, trauma data is a form of exemplar data that essentially blocks training for a period (e.g., an iteration of the MLPNN 21) while trauma is applied to the neural network to emulate plasticity of the brain by providing random weight changes.

Feature vectors 38 are produced from each type of input 30. Each feature vector 38 is input for an input node in the MLPNN 21. As the MLPNN 21 works in parallel on the different input nodes, convergence is achieved on a series of end states. Each state has a probability associated with the truth of a bit. The binary bit of each output node establishes the chromosome 22. The chromosome 22 encodes a pattern that relates an algorithm that creates data templates (i.e., extractor 38) to a particular matching heuristic (i.e., matcher 40). Once the extractor/matcher pair is determined, they are used to create a template and check for a match for the inputted data. The output of the extractor/matcher pair is fed into a state machine to determine an output 28. If the input was an exemplar, back propagation training occurs within the MLPNN 21. Otherwise, output 28 is, e.g., displayed to the user.

In the background of biometric system 18, a genetic algorithm 26 is continuously running to create new chromosomes that also enhance the plasticity of the neuroplastic fidelity process. Each chromosome is a bit string that is stored within a chromosome look-up table 44 with an associated score. Scores are calculated only when exemplars 34 enter the system. As such, during idle time, training continues throughout the system.

Three types of operators exist within the genetic algorithm 26: reproduction, crossover and mutation. Reproduction involves the selection of two chromosomes to create a resulting offspring using an exclusive or (XOR) operation. Crossover identifies a pivot point in two chromosome strings, which is defined as the first digit that is different between the two chromosomes, and swaps two substrings together. Mutation, as with the brain, mutates existing chromosomes based on environmental factors. Each resulting bit string is associated with an operator and parents if applicable. In an illustrative embodiment, only a limited number of chromosomes, e.g., four, are retained.

Figure 3:
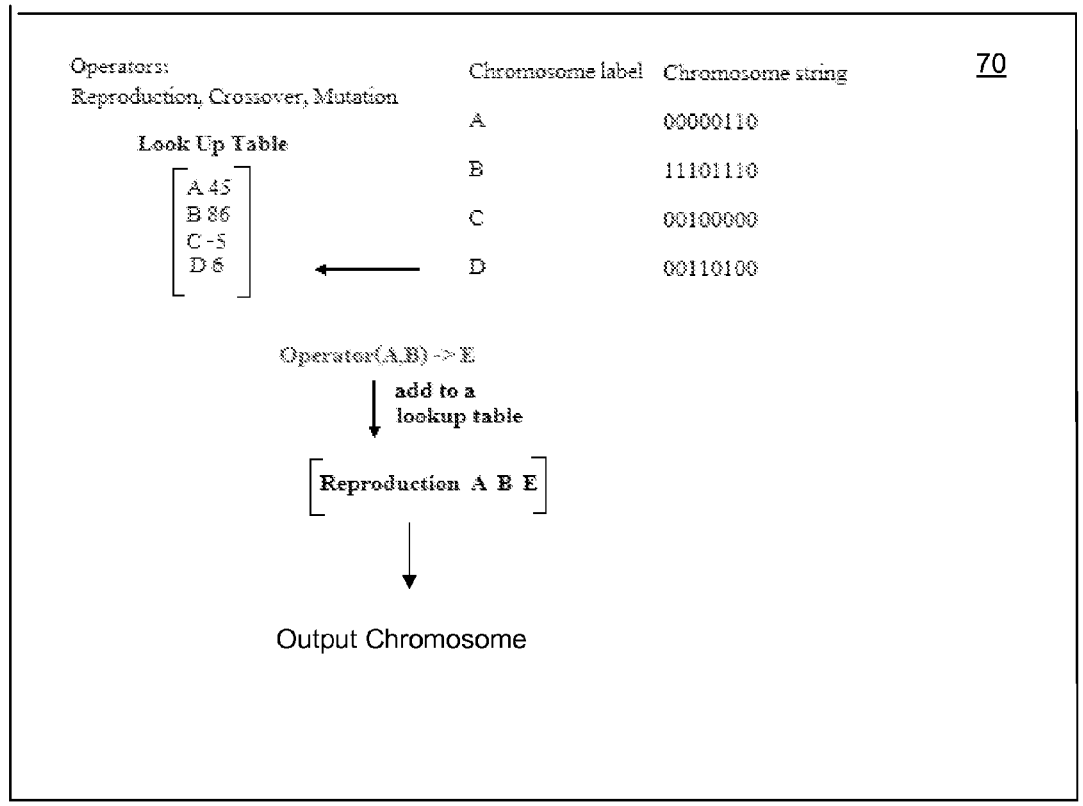
FIG. 3 depicts a genetic algorithm in accordance with an embodiment of the present invention.

The emergent chromosome look-up table 44 is utilized to lookup related output bit strings from the MLPNN 21 that have sufficient probability associated with each bit. FIG. 3 depicts a genetic algorithm for extractor to matcher pairing optimizations. Each MLPNN 21 has a probability associated with each bit. If the probability for a position is low, the bit can be flipped to see if the chromosome is in the look-up table 44. If the utility of a potential bit string as determined by E is lower than the original bit string, e.g. before bit flip, the original string is maintained. If either of the bit strings are not present within the lookup table, the original bit string is maintained. The look up table is utilized to determine which bit patterns as determined from a sufficiently low bit probability from the MLPNN is ranked higher. As a result, the higher ranking bit string is maintained under a probabilistic framework.

The following example describes how the process improves security. Assume an Individual A scans ten fingers on a live scan fingerprint reader. The neuroplastic fidelity process described above would determine the appropriate extractor/matcher pair to utilize with identifying the subject. The fingerprint image is converted to a minutiae template and then compared to all other minutiae templates 28 within the database. The following day, assume individual B attempts to fake a fingerprint. Individual B tries to enroll a fake fingerprint. The results yield a similarity score to individual A's fingerprint template. Individual B tries modifying the fake finger to increase the next score. To individual B's dismay, he is cannot converge to exploit the pattern of the template generator.

Figure 2:
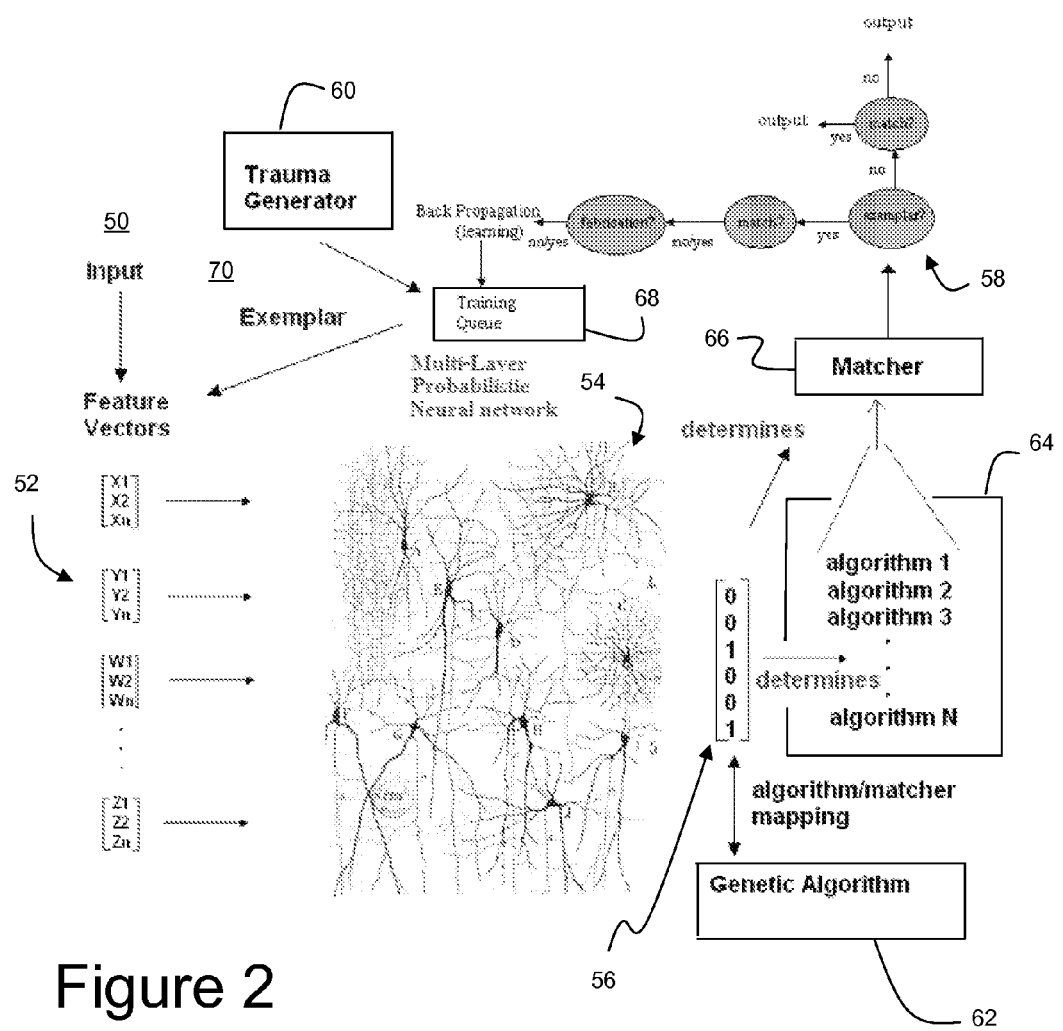
FIG. 2 depicts a conceptual flow diagram of a method of implementing a biometric system in accordance with an embodiment of the present invention.

FIG. 2 depicts a conceptual flow diagram of a neuroplastic fidelity process. On the left, a set of feature vectors 52 are inputted into the neural network 54. As noted above, feature vectors 52 are obtained from operational input 50, exemplar input 70, and trauma input. Trauma input is obtained from trauma generator 60, and is held in training queue 68 with exemplar data.

The output of the neural network 54 is a chromosome 56 that determines which extractor algorithm 64 to use, as well which matcher 66 to use. The chromosome 56 is also fed to the genetic algorithm 62 for further processing. Once the input is processed by the extractor algorithm 64 and matcher 66, the result is fed to state machine 58 that determines whether there was a match, if the input was an exemplar, and whether the result should be reintroduced to the training queue 68 using back propagation.

Probabilistic neural network technology has been in existence since the 1950's in which neural networks emulate neuron computation. As with the brain which changes the bias weights that determine the classification curve for a neuron, trauma generator 60 dynamically changes feature vector mappings to an extractor/matcher pair.

Figures 5, 6:
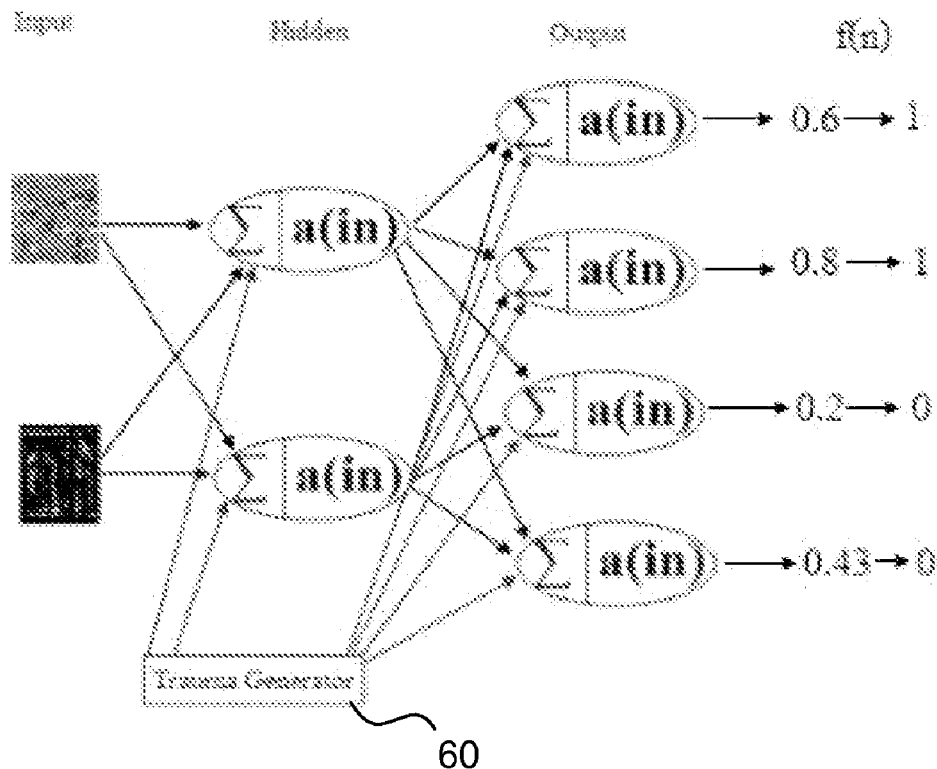
FIG. 5 depicts an overview of a trauma generator influencing a chromosome.
FIG. 6 depicts a mapping overview.

FIG. 5 shows how the neural network output pattern is mapped to a pair of extractor and matcher. Since there are more bit combinations within a length of 4, the combinations of the bit strings are evenly distributed between the pairs of extractor and matcher. As a result, a 1:1 mapping is produced between the output of a neural network and the possible bit combinations of length 4. In this example K represents a mapping between templatizers and matchers defined as:

$$K=1100=2^4+2^3+0+0=24,$$

The total number of possible mappings between templatizers and matchers is from the conditional equation:

$$\#conditionals=(4\ choose\ 1)+(4\ choose\ 2)+(4\ choose\ 3)+(4\ choose\ 4).$$

Once the value K is determined, it can be inputted into a simple algorithm to select an extractor/matcher pair, such as the following:

```
int matcherID;
if (K&30){
    matcherID = a_1
    extractorID = b_1
}
else if (K&28){
    matcherID = a_2
    extractorID = b_2
}
else if (K&24){
    matcherID = a_3
    extractorID = b_3
}
elseif(K&16){
    matcherID = a_4
    extractorID = b_4
}
```

Optionally, a separate server could be utilized to compute the best set of extractor and matcher pairs. On the server, a genetic algorithm would continually be running with truth data. Each bit string representation from the neural network 21 would be passed to the genetic algorithm 26. The bit string pattern maps to a matcher and extractor through a chromosome. Each bit in the chromosome represents a pairing of matchers and extractors. The feature description bit code describes the data of the current domain. The chromosome scores are evaluated with respect to the best Receiver Operational Characteristics. The genetic algorithm will converge on an optimal mapping between the feature description bit code and an optimal matcher and extractor. See, e.g., FIG. 6.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising biometric system 18 could be created, maintained and/or deployed by a service provider that offers the functions described herein for customers. That is, a service provider could offer to deploy or provide biometric security as described above.

It is understood that in addition to being implemented as a system and method, the features may be provided as a program product stored on a computer-readable medium, which when executed, enables computer system 10 to provide biometric security. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A computer implemented method for providing biometric security, comprising:
   receiving biometric data;
   analyzing the biometric data with a probabilistic neural network and outputting a chromosome having a plurality of bits;
   mapping the plurality of bits of the chromosome to an extractor selected from a plurality of extractors and to a matcher selected from a plurality of matchers;
   applying the selected extractor to the biometric data to generate a template;
   using the selected matcher to compare the template to a set of stored templates to identify a match; and
   outputting a result.

2. The method of claim 1, wherein the chromosome includes a binary string and each bit of the chromosome represents an end state having an associated probability.

3. The method of claim 1, wherein the biometric data comprises exemplar data used to train the probabilistic neural network.

4. The method of claim 1, wherein the biometric data comprises trauma data to pause the neural network for an iteration to provide random weight changes that alter the plasticity of the probabilistic neural network.

5. The method of claim 1, wherein the chromosome is stored in a chromosome look-up table along with an associated score.

6. The method of claim 5, further comprising continuously creating new chromosomes based on existing chromosomes stored in the chromosome look-up table.

7. A computer program product stored on a non-transitory computer readable medium, which when executed by a computer system provides biometric security, and comprises:
   program code for receiving biometric data;
   program code for analyzing the biometric data with a probabilistic neural network and outputting a chromosome having a plurality of bits;

program code for mapping the plurality of bits of the chromosome to an extractor selected from a plurality of extractors and to a matcher selected from a plurality of matchers;

program code for applying the selected extractor to the biometric data to generate a template;

program code for using the selected matcher to compare the template to a set of stored templates to identify a match; and program code for outputting a result.

8. The computer program product of claim 7, wherein the chromosome includes a binary string and each bit of the chromosome represents an end state having an associated probability.

9. The computer program product of claim 7, wherein the biometric data comprises exemplar data used to train the probabilistic neural network.

10. The computer program product of claim 7, wherein the biometric data comprises trauma data to pause the neural network for an iteration to provide random weight changes that alter the plasticity of the probabilistic neural network.

11. The computer program product of claim 7, wherein the chromosome is stored in a chromosome look-up table along with an associated score.

12. The computer program product of claim 11, further comprising program code for continuously creating new chromosomes based on existing chromosomes stored in the chromosome look-up table.

13. A computer implemented method for deploying a system for providing biometric security, comprising:
    providing a computer infrastructure being operable to:
        receive biometric data;
        analyze the biometric data with a probabilistic neural network and output a chromosome containing a plurality of bits;
        map the plurality of bits of the chromosome to an extractor selected from a plurality of extractors and to a matcher selected from a plurality of matchers;
        apply the selected extractor to the biometric data to generate a template;
        use the selected matcher to compare the template to a set of stored templates to identify a match; and
        output a result.

* * * * *